United States Patent
Pedersen et al.

(10) Patent No.: US 12,450,027 B2
(45) Date of Patent: Oct. 21, 2025

(54) ACCESSORY DEVICE FOR A HEARING DEVICE

(71) Applicant: GN Hearing A/S, Ballerup (DK)

(72) Inventors: Brian Dam Pedersen, Karlslunde (DK); Thorkild Find Pedersen, Valby (DK)

(73) Assignee: GN HEARING A/S, Ballerup (DK)

( * ) Notice: Subject to any disclaimer, the term of this patent is extended or adjusted under 35 U.S.C. 154(b) by 384 days.

(21) Appl. No.: 18/085,441

(22) Filed: Dec. 20, 2022

(65) Prior Publication Data

US 2023/0205487 A1  Jun. 29, 2023

(30) Foreign Application Priority Data

Dec. 23, 2021  (DK) .............................. PA 202170670

(51) Int. Cl.
*G06F 3/16* (2006.01)
*G10L 15/22* (2006.01)

(52) U.S. Cl.
CPC .............. *G06F 3/167* (2013.01); *G10L 15/22* (2013.01)

(58) Field of Classification Search
CPC ................................. G06F 3/167; G10L 15/22
See application file for complete search history.

(56) References Cited

U.S. PATENT DOCUMENTS

2003/0223604 A1* 12/2003 Nakagawa .......... H04M 1/6066
381/311

* cited by examiner

*Primary Examiner* — Andrew Sniezek
(74) *Attorney, Agent, or Firm* — Vista IP Law Group, LLP

(57) ABSTRACT

A hearing device and an accessory device for a hearing device is disclosed, the accessory device comprising an interface, one or more processors, and a memory, the memory having an audio configuration of the hearing device stored therein, the audio configuration comprising a visibility setting indicative of the hearing device, wherein the one or more processors are configured to: receive, via the interface, a configuration request for update of the audio configuration, the configuration request comprising an updated visibility setting; determine, in response to the configuration request, an updated audio configuration including the updated visibility setting; and transmit, via the interface, the updated audio configuration to the hearing device.

20 Claims, 4 Drawing Sheets

ACCESSORY DEVICE FOR A HEARING DEVICE

RELATED APPLICATION DATA

This application claims priority to, and the benefit of, Danish Patent Application No. PA 202170670 filed on Dec. 23, 2021. The entire disclosure of the above application is expressly incorporated by reference herein.

FIELD

The present disclosure relates to an accessory device for a hearing device and related methods including a method of operating a hearing device.

BACKGROUND

Recent developments within wireless audio streaming from electronic devices enable an electronic device to stream wireless audio to a hearing device. The new possibilities for wireless streaming on the other hand entail challenges for the hearing device.

SUMMARY

Accordingly, there is a need for hearing devices and methods with improved wireless audio management.

An accessory devices for a hearing device is disclosed, the accessory device comprising an interface, one or more processors, and a memory, the memory having an audio configuration of the hearing device stored therein, the audio configuration optionally comprising a visibility setting indicative of a visibility of the hearing device, wherein the one or more processors are configured to receive, via the interface, a configuration request for update of the audio configuration, the configuration request optionally comprising an updated visibility setting; determine, in response to the configuration request, an updated audio configuration optionally including the updated visibility setting; and transmit, via the interface, the updated audio configuration to the hearing device.

A hearing device is disclosed, the hearing device comprising an interface, a processor, and a memory, the memory having an audio configuration stored therein, the audio configuration optionally comprising a visibility setting indicative of a visibility of the hearing device, wherein the hearing device/processor is configured to receive, via the interface, an updated audio configuration; store the updated audio configuration as the audio configuration in the memory; and operate the hearing device according to the audio configuration.

Also disclosed is a user interface of an accessory device.

It is an important advantage of the hearing device that a hearing device user can manage and control aspects of wireless audio reception in the hearing device.

Further, the present disclosure allows for improved and customized setting of audio configurations in hearing devices, e.g. allowing a user to hide his/her hearing device from other electronic devices. Further, a user may be allowed to define or customize audio reception in his/her hearing device by assigning priorities or priority rules to different audio devices and the audio received by these audio devices.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
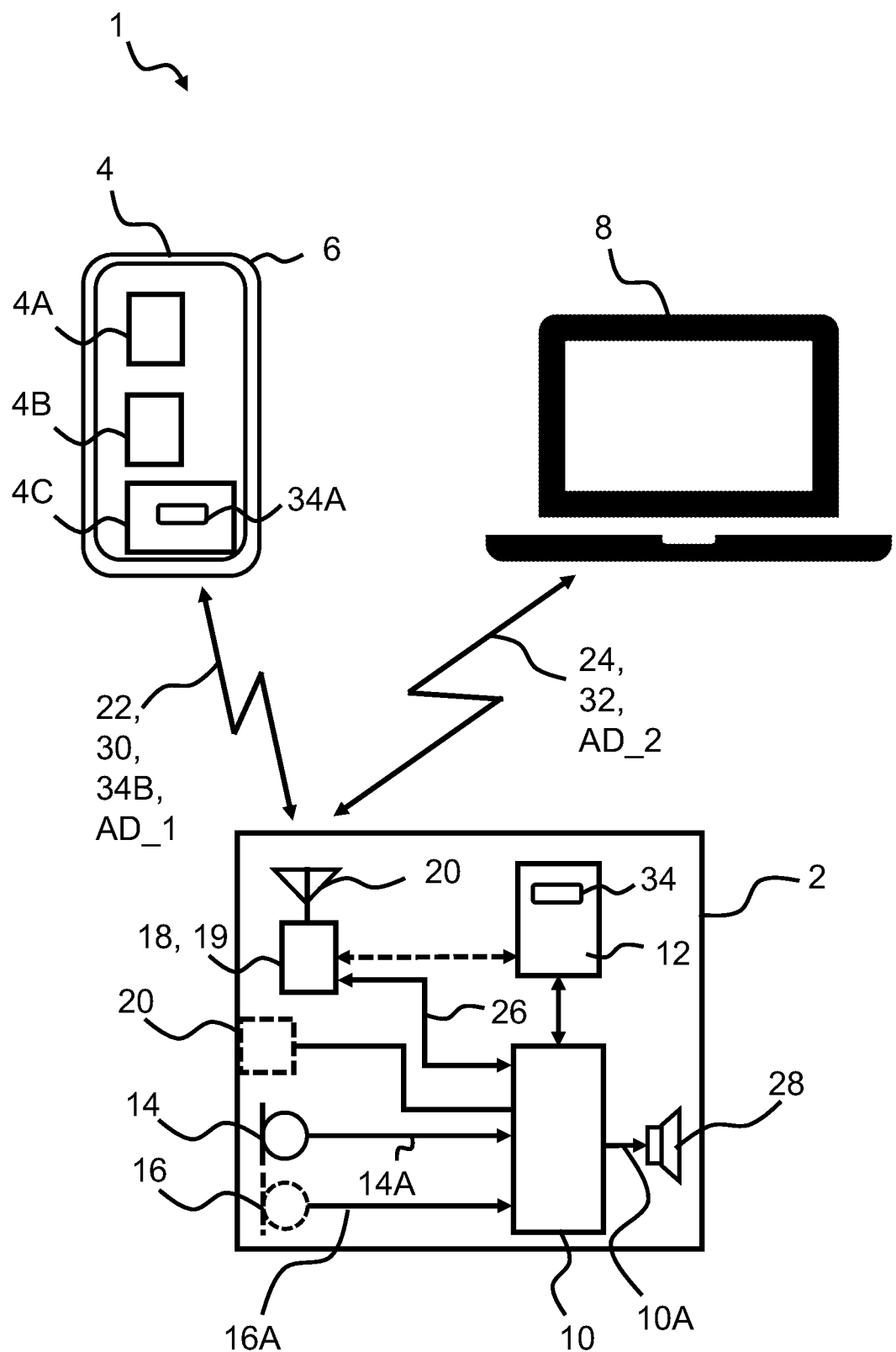
FIG. 1 schematically illustrates an exemplary hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE hearing device, RIC hearing device and MaRIE hearing device refer to hearing devices where the receiver may be comprised in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In one or more example hearing devices, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In one or more example hearing devices, the hearing device may comprise one or more antennas configured for wireless communication. The one or more antennas may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antennas may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In one or more example hearing devices, the hearing device may comprise one or more wireless communication units. The one or more wireless communication units may comprise one or more wireless receivers, one or more wireless transmitters, one or more transmitter-receiver pairs and/or one or more transceivers. At least one of the one or more wireless communication units may be coupled to the one or more antennas. The wireless communication unit may be configured for converting one or more wireless signals received by at least one of the one or more antennas into a second electric input signal. The hearing device may be configured for wired/wireless audio communication, e.g. enabling the user to listen to media, such as music or radio and/or enabling the user to perform phone calls. Wireless input signals from different external sources may be multiplexed in the radio transceiver to audio data or provided as separate audio data on separate transceiver output terminals of the radio transceiver.

In one or more example hearing devices, the wireless signal(s) may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a tablet computer, a laptop computer, a smartphone and/or a smart watch.

Thus, the hearing device/interface may be configured for wireless communication with one or more audio devices also denoted audio sources. The hearing device/interface may be configured for wireless communication with one or more accessory devices, such as a tablet computer, a laptop computer, a smartphone and/or a smart watch. An accessory device may operate, be, and/or function as an audio device.

In one or more example hearing devices, the wireless input signal(s) comprises or are representative of audio data, e.g. the first audio data and/or second audio data. In other words, the audio data may be encoded in the wireless input signal(s). The wireless input signal(s) may origin from external audio source(s), such as audio devices, e.g. spouse microphone device(s), wireless TV audio transmitter(s), music player(s), car(s), doorbell(s), mobile phone(s), smart watch(es), and wireless audio transmitters(s), such as public wireless audio transmitter(s), e.g. in airports, train stations, stadiums, cinemas, and/or arenas. The wireless input signal(s) may origin from one or more accessory devices.

In one or more example hearing devices, the hearing device may include a processing unit. The processing unit may be configured for processing the first electric input signal and/or the second electric input signal, such as audio data. The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first electric input signal and/or the second electric input signal. The processing unit may be configured to provide a second electric output signal. The second electric output signal may be based on the processing of the first electric input signal and/or second electric input signal.

In one or more example hearing devices, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In one or more example hearing devices, the wireless communication unit may be configured for converting the second electric output signal into a wireless output signal. The wireless output signal may comprise synchronization data. The wireless communication unit may be configured for transmitting the wireless output signal via at least one of the one or more antennas.

In one or more example hearing devices, the hearing device may comprise a digital-to-analogue converter configured to convert the first electric output signal, the second electric output signal and/or the wireless output signal into an analogue signal.

In one or more example hearing devices, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In one or more example hearing devices, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

An accessory device for a hearing device is disclosed. The accessory device comprises an interface, one or more processors, and a memory.

The accessory device/interface may be configured for wireless communication with one or more hearing devices. The accessory device may be an electronic device, such as a tablet computer, a laptop computer, a smartphone and/or a smart watch. An accessory device may be configured to operate, be, and/or function as an audio device also denoted audio source, e.g. for transmitting or streaming audio or audio data to a hearing device connected to the accessory device.

The memory of the accessory device and/or the memory of the audio device may have an audio configuration of the hearing device stored therein. The audio configuration comprises one or more settings defining properties and functionalities related to wireless audio reception in the hearing device.

The audio configuration may comprise a visibility setting indicative of visibility of the hearing device. The visibility setting may be on or off. In one or more example hearing devices, when the visibility setting is on, other devices are able to see you, i.e. other devices can discover the hearing device when searching. In one or more example hearing devices, when the visibility setting is off, the hearing device is only visible to one or more predefined devices, such as devices paired with the hearing device.

The processor is configured to receive, via the interface, a configuration request for update of the audio configuration. The configuration request may comprise one or more updated settings, such as an updated visibility setting. In one or more example, the configuration request may be a user activation of a user interface element of a user interface, e.g. on a touch-sensitive display of the interface.

The processor is configured to determine, in response to the configuration request, an updated audio configuration. The updated audio configuration may include the updated visibility setting.

The processor is configured to transmit, via the interface, the updated audio configuration to the hearing device. The processor may be configured to transmit, via the interface, the updated audio configuration by transmitting the updated audio configuration or parts thereof, e.g. the parts of the audio configuration that have been changed or updated. The processor may be configured to store the updated audio configuration in the memory of the accessory device.

In one or more example accessory devices for a hearing device, the accessory device comprises an interface, one or more processors, and a memory, the memory having an audio configuration of the hearing device stored therein, the audio configuration comprising a visibility setting indicative of the hearing device, wherein the one or more processors are configured to receive, via the interface, a configuration request for update of the audio configuration, the configuration request comprising an updated visibility setting; determine, in response to the configuration request, an updated audio configuration including the updated visibility setting; and transmit, via the interface, the updated audio configuration to the hearing device.

In one or more example accessory devices, the visibility setting comprises a discoverability setting of the hearing device, wherein the configuration request comprises an updated discoverability setting, and wherein to determine an updated audio configuration comprises to include the updated discoverability setting in the updated audio configuration.

In one or more example accessory devices, the visibility setting comprises a name setting, wherein the configuration request comprises an updated name setting, and wherein to determine an updated audio configuration comprises to include the updated name setting in the updated audio configuration.

In one or more example accessory devices, the configuration request comprises a first device setting for a first audio device. The first device setting may set or define audio settings for a first audio device configured to stream audio to the hearing device. The first device setting may comprise a first priority setting for the first audio device. The updated first priority setting may define or set priorities for handling audio streams in the hearing device. The first priority setting may comprise one or more priorities associated with first audio transmitted from the first audio device, e.g. associated with one or more first identifiers, such as a first device type identifier, a first context type identifier, and a first application type identifier. In one or more example accessory devices, the first device setting may comprise an updated first priority setting, such as one or more of an updated first device priority, an updated first context priority, and an updated first application priority. To determine an updated audio configuration may comprise to include the first device setting, such as the updated first priority setting e.g. one or more of the updated first device priority, the updated first context priority, and the first updated application priority, in the updated audio configuration.

In one or more example accessory devices, to determine an updated audio configuration comprises to determine an updated audio selection scheme based on the updated first priority setting such as based on one or more of the updated first device priority, the updated first context priority, and the updated first application priority; and include the updated audio selection scheme in the updated audio configuration.

In one or more example accessory devices, the configuration request comprises a second device setting for a second audio device. The second device setting may set or define audio settings for a second audio device configured to stream audio to the hearing device. The second device setting may comprise a second priority setting for the second audio device. The updated second priority setting may define or set priorities for handling audio streams in the hearing device. The second priority setting may comprise one or more priorities associated with second audio transmitted from the second audio device, e.g. associated with one or more second identifiers, such as a second device type identifier, a second context type identifier, and a second application type identifier. In one or more example accessory devices, the second device setting may comprise an updated second priority setting, such as one or more of an updated second device priority, an updated second context priority, and an updated second application priority. To determine an updated audio configuration may comprise to include the second device setting, such as the updated second priority setting e.g. one or more of the updated second device priority, the updated second context priority, and the second updated application priority, in the updated audio configuration.

In one or more example accessory devices, to determine an updated audio selection scheme comprises to: determine an updated audio selection scheme based on the updated second priority setting such as based on one or more of the updated second device priority, the updated second context priority, and the updated second application priority; and include the updated audio selection scheme in the updated audio configuration.

In one or more example accessory devices, the interface comprises a camera, wherein to receive a configuration request for update of the audio configuration comprises to obtain image data, e.g. associated with an audio device, with the camera. The accessory device may be configured to determine one or more properties or identifiers of an audio device, such as a source identifier based on the image data. In one or more example hearing devices, to determine an updated audio configuration comprises to include the source identifier in the updated audio configuration.

In one more example hearing devices, the memory has an audio configuration stored therein. The audio configuration may comprise a visibility setting indicative of the hearing device, wherein the hearing device/processor is configured to receive, via the interface, an updated audio configuration; store the updated audio configuration as the audio configuration in the memory; and operate the hearing device according to the audio configuration.

In one or more example hearing devices, the visibility setting comprises a discoverability setting of the hearing device, and to operate the hearing device according to the updated audio configuration comprises to, in accordance with the discoverability setting being indicative of a discoverable hearing device, operate the hearing device in a discovery mode.

In one or more example hearing devices, the visibility setting comprises a name setting, and to operate the hearing device in a discovery mode comprises to transmit a device name indicative of the name setting.

In one or more example hearing devices, the updated audio configuration may comprise a first device setting, such as an updated first priority setting e.g. one or more of the updated first device priority, the updated first context priority, and the first updated application priority, and to operate the hearing device according to the updated audio configuration comprises to determine an audio output scheme based on the updated audio configuration, e.g. based on the updated first priority setting; and provide an audio output, e.g. via a receiver of the interface, according to the audio output scheme.

In one or more example hearing devices, the updated audio configuration may comprise an updated audio selection scheme, and to operate the hearing device according to the updated audio configuration comprises to determine an audio output scheme based on the updated audio selection scheme; and provide an audio output, e.g. via a receiver of the interface, according to the audio output scheme.

In one or more example hearing devices, the updated audio configuration may comprise a second device setting, such as an updated second priority setting e.g. one or more of the updated second device priority, the updated second context priority, and the second updated application priority, and to operate the hearing device according to the updated audio configuration comprises to determine an audio output scheme based on the updated audio configuration, e.g. based on the updated second priority setting; and provide an audio output, e.g. via a receiver of the interface, according to the audio output scheme.

The hearing device, such as radio transceiver and/or processor, may be configured to determine an audio output scheme based on the updated audio configuration, first audio data from a first audio device and/or second audio data from a second audio device. An audio output scheme may define or set which audio device to select from a set of available/streaming audio devices including the first audio device and the second audio device.

In other words, the hearing device may be configured to receive, via the interface, first audio data from a first audio device; receive, via the interface, second audio data from a second audio device; operate the hearing device according to the updated audio configuration by to determine an audio output scheme based on the updated audio configuration, the first audio data, and the second audio data; and provide, e.g. via a receiver or loudspeaker of the interface, an audio output according to the audio output scheme.

In one or more example hearing devices, the hearing device is configured to: obtain calendar data from a calendar application and/or time data e.g. from an internal clock of the hearing device; and determine the audio output scheme based on the calendar data and/or the time data. Thereby, a user may be able to manage or handle an audio device differently depending on the time of day and/or depending on scheduled user activity. For example, a scheduled teleconference from an audio device may have higher priority than an unscheduled call from the same audio device.

In one or more example hearing devices, the first audio data comprises a first device type identifier also denoted DTI_1, and wherein the hearing device, such as radio transceiver and/or processor, is configured to determine the audio output scheme based on the first device type identifier.

In one or more example hearing devices, the first audio data comprises a first context type identifier also denoted CTI_1, and wherein the hearing device, such as radio transceiver and/or processor, is configured to determine the audio output scheme based on the first context type identifier.

In one or more example hearing devices, the first audio data comprises a first application type identifier also denoted ATI_1, and wherein the hearing device, such as radio transceiver and/or processor, is configured to determine the audio output scheme based on the first application type identifier.

In one or more example hearing devices, the second audio data comprises a second device type identifier also denoted DTI_2, and wherein the hearing device, such as radio transceiver and/or processor, is configured to determine the audio output scheme based on the second device type identifier.

In one or more example hearing devices, the second audio data comprises a second context type identifier also denoted CTI_2, and wherein the hearing device, such as radio transceiver and/or processor, is configured to determine the audio output scheme based on the second context type identifier.

In one or more example hearing devices, the second audio data comprises a second application type identifier also denoted ATI_2, and wherein the hearing device, such as radio transceiver and/or processor, is configured to determine the audio output scheme based on the second application type identifier.

A device type identifier, such as DTI_1 and/or DTI_2, may be selected from a set of device type identifiers also denoted DTI_SET. The set of device type identifiers may comprise a plurality of device type identifiers, such as two, three, four, or more device type identifiers.

For example, DTI_SET may comprise a device type identifier indicative of the audio device being a laptop computer. DTI_SET may comprise a device type identifier indicative of the audio device being a mobile phone. DTI_SET may comprise a device type identifier indicative of the audio device being a smartwatch. DTI_SET may comprise a device type identifier indicative of the audio device being a spouse microphone device. DTI_SET may comprise a device type identifier indicative of the audio device being a wireless TV audio transmitter. DTI_SET may comprise a device type identifier indicative of the audio device being a music player. DTI_SET may comprise a device type identifier indicative of the audio device being a doorbell. DTI_SET may comprise a device type identifier indicative of the audio device being a wireless audio transmitter, such as a public wireless audio transmitter. DTI_SET may comprise a device type identifier indicative of the audio device being an emergency vehicle. DTI_SET may comprise a device type identifier indicative of the audio device being an alarm device. DTI_SET may comprise a device type identifier indicative of the audio device being an "OTHER" device.

In one or more example hearing devices, DTI_SET comprises one or more of the device type identifiers "LAPTOP", "MOBILE PHONE", "EMERGENCY", "SPOUSE MIC", "DOORBELL". In one or more example hearing devices, device type identifiers are numbers each mapped to a specific type of identifier, e.g. according to a protocol. For example a device type identifier "1" may refer to or indicate a doorbell as defined in a protocol.

A context type identifier, such as CTI_1 and/or CTI_2, may be selected from a set of context type identifiers also denoted CTI_SET. The set of context type identifiers may comprise a plurality of context type identifiers, such as two, three, four, or more context type identifiers. For example, CTI_SET may comprise a context type identifier indicative of the context being a phone call. CTI_SET may comprise a context type identifier indicative of the context being music. CTI_SET may comprise a context type identifier indicative of the context being a conference call. For example, CTI_SET may comprise a context type identifier indicative of the context being audio of a video. For example, CTI_SET may comprise a context type identifier indicative of the context being "OTHER"

In one or more example hearing devices, CTI_SET comprises one or more of the context type identifiers "PHONE CALL", "MUSIC", "CONF CALL", "VIDEO". In one or more example hearing devices, context type identifiers are numbers each mapped to a specific type of identifier, e.g. according to a protocol. For example, a context type identifier "1" may refer to or indicate a phone call as defined in a protocol.

An application type identifier, such as ATI_1 and/or ATI_2, may be selected from a set of application type identifiers also denoted ATI_SET. The set of application type identifiers may comprise a plurality of application type identifiers, such as two, three, four, or more application type identifiers. For example, ATI_SET may comprise an application type identifier indicative of the application being a conference application, such as Teams™, Zoom™ or others. ATI_SET may comprise an application type identifier indicative of the application being a web browser. ATI_SET may comprise an application type identifier indicative of the application being a multimedia application, such as Netflix™, YouTube™, Apple Music, Spotify, or others. ATI_SET may comprise an application type identifier indicative of the application being a phone call application.

In one or more example hearing devices, ATI_SET comprises one or more of the application type identifiers "CONF APP", "BROWSER", "MEDIA APP", "PHONE CALL APP". In one or more example hearing devices, application type identifiers are numbers each mapped to a specific type of identifier, e.g. according to a protocol. For example, an application type identifier "1" may refer to or indicate a conference application as defined in a protocol.

In one or more example hearing devices, the hearing device, such as radio transceiver and/or processor, may be configured to determine the audio output scheme based on calendar data, such as calendar data indicative of meetings, such as online meetings. For example, the audio output scheme may be based on a start time and/or an end time of a meeting or other appointment. In one or more example hearing devices, the calendar data are included in the audio data, such as the first audio data and/or the second audio data. In one or more example hearing devices, the calendar data are provided separate from the audio data, e.g. from an accessory device having a calendar application/calendar data stored thereon.

In one or more example hearing devices, to determine an audio output scheme based on the first audio data and the second audio data comprises to determine a first priority also denoted P_1 based on the first audio data and optionally the audio configuration in the memory of the hearing device. In one or more example hearing devices, to determine an audio output scheme based on the first audio data and the second audio data comprises to determine a second priority P_2 based on the second audio data and optionally the audio configuration in the memory of the hearing device. The first priority is indicative of a priority of the first audio data or of the audio received from the first audio device. The second priority is indicative of a priority of the second audio data or of the audio received from the second audio device.

In one or more example hearing devices, the hearing device, such as radio transceiver and/or processor, is configured to determine the first priority based on one or more of first device type identifier, first context type identifier, and first context type identifier of the first audio data. Thus, the first priority may be given as $$P\_1=f\_1(DTI\_1,CTI\_1,ATI\_1),$$

where f_1 is a priority function or mapping.

In one or more example hearing devices, the hearing device, such as radio transceiver and/or processor, is configured to determine the first priority based on a first device identifier DI_1 of the first audio device. In other words, the first audio data may comprise a first device identifier of the first audio device.

Thus, the first priority may be given as $$P\_1=f\_1(DI\_1,DTI\_1,CTI\_1,ATI\_1),$$

where f_1 is a priority function or mapping of one or more of DI_1, DTI_1, CTI_1, and ATI_1 to a first priority. Thereby, different priorities may be assigned to devices of the same type, such as a private mobile phone and a work mobile phone.

In one or more example hearing devices, the hearing device, such as radio transceiver and/or processor, is configured to determine the second priority based on one or more of second device type identifier, second context type identifier, and second context type identifier of the second audio data. Thus, the second priority may be given as $$P\_2=f\_2(DTI\_2,CTI\_2,ATI\_2),$$

where f_2 is a priority function or mapping.

In one or more example hearing devices, the hearing device, such as radio transceiver and/or processor, is configured to determine the second priority based on a second device identifier DI_2 of the second audio device. In other words, the second audio data may comprise a second device identifier of the second audio device.

Thus, the second priority may be given as $$P\_2=f\_2(DI\_2,DTI\_2,CTI\_2,ATI\_2),$$

where f_2 is a priority function or mapping of one or more of DI_2, DTI_2, CTI_2, and ATI_2 to a second priority. Thereby, different priorities may be assigned to devices of the same type, such as a private mobile phone and a work mobile phone.

When the audio configuration comprises device identifier(s), corresponding or associated device type identifier(s) may be omitted, since the device identifier(s) may indicate the device type(s).

In one or more example hearing devices, a first priority associated with the first audio data and/or first audio device may be included in the first audio data, and wherein to determine an audio output scheme is based on the first priority of the first audio data. A second priority associated with the second audio data and/or second audio device may be included in the second audio data, and wherein to determine an audio output scheme is based on the second priority of the second audio data. In other words, an audio device may be allowed to assign a priority to the audio transmitted from the audio device.

To determine an audio output scheme based on the first audio data and the second audio data may comprise to set an audio source identifier of the audio output scheme based on the first priority and/or the second priority, for example by selecting the audio device with the highest priority. In one or more example hearing devices, to provide an audio output, e.g. via a receiver or loudspeaker of the interface, according to the audio output scheme comprises to output audio according to the audio source identifier. In other words, the hearing device may be configured to output audio received from the audio device indicated by the audio source identifier of the audio output scheme.

In one or more example hearing devices, to provide an audio output according to the audio output scheme comprises, in accordance with the audio source identifier being indicative of the first audio device, to output audio, e.g. via a receiver or loudspeaker of the interface, based on the first audio data. In other words, the hearing device may be configured to play audio received from the first audio device in accordance with audio output scheme being indicative of the first audio device as the active audio device.

In one or more example hearing devices, to provide an audio output according to the audio output scheme comprises, in accordance with the audio source identifier being indicative of the second audio device, to output audio, e.g. via a receiver or loudspeaker of the interface, based on the second audio data. In other words, the hearing device may be configured to play audio received from the second audio device in accordance with audio output scheme being indicative of the second audio device as the active audio device.

In one or more example hearing devices, to determine an audio output scheme is based on an audio configuration stored in the memory.

The audio configuration may comprise a first device setting. The first device setting also denoted DS_1 may be associated with an audio device of a first type. The audio configuration/first device setting may comprise a first priority setting for the first audio device. The first device setting/first priority setting may comprise one or more of a first device priority, a first context priority or a plurality of first context priorities each associated with a context type, and a first application priority or a plurality of first application priorities each associated with an application type. In one or more example hearing devices, to determine a first priority based on the first audio data comprises to determine the first priority based on the first device setting, such as based on the first priority setting, e.g. based on one or more of the first device priority, the first context priority, and the first application priority of the audio configuration. In other words, the audio configuration may define a look-up table, a rule-set, a mapping, or a function for determining a first priority based on the first audio data. The audio configuration/first device setting may comprise a first device identifier of the first audio device.

The audio configuration may comprise a second device setting. The second device setting may be associated with an audio device of a second type. The audio configuration/second device setting may comprise a second priority setting for the second audio device. The second device setting/second priority setting may comprise one or more of a second device priority, a second context priority or a plurality of second context priorities each associated with a context type, and a second application priority or a plurality of second application priorities each associated with an application type. In one or more example hearing devices, to determine a second priority based on the second audio data comprises to determine the second priority based on the second device setting, such as based on the second priority setting, e.g. based on one or more of the second device priority, the second context priority, and the second application priority of the audio configuration. In other words, the audio configuration may define a look-up table, a rule-set, a mapping, or a function for determining a second priority based on the second audio data. The audio configuration/second device setting may comprise a second device identifier of the second audio device.

An example audio configuration being a look-up table for determining priorities of audio devices transmitting audio data to the hearing device is shown in Tables 1 and below, where a low number in priority indicates high priority:

TABLE 1

Example audio configuration

| DTI | CTI | ATI | Priority setting |
|---|---|---|---|
| EMERGENCY | | | 1 |
| DOORBELL | | | 5 |
| SPOUSE MIC | | | 7 |
| TV AUDIO | | | 8 |
| MOBILE PHONE | PHONE CALL | PHONE CALL APP | 10 |
| | CONF CALL | CONF APP | 19 |
| | | BROWSER | 20 |
| | | PHONE CALL APP | 18 |
| | VIDEO | BROWSER | 40 |
| | | MEDIA APP | 25 |
| | MUSIC | BROWSER | 41 |
| | | MEDIA APP | 17 |
| LAPTOP | CONF CALL | CONF APP | 13 |
| | | BROWSER | 14 |
| | VIDEO | BROWSER | 35 |
| | | MEDIA APP | 34 |
| | MUSIC | BROWSER | 45 |
| | | MEDIA APP | 42 |

An example audio configuration comprising audio device identifiers and being a look-up table for determining priorities of audio devices transmitting audio data to the hearing device is shown in Table 2 below, where a low number in priority indicates high priority:

TABLE 2

Example audio configuration

| DI | DTI | CTI | ATI | Priority setting |
|---|---|---|---|---|
| 1 | LAPTOP | CONF CALL | CONF APP | 3 |
| | | | BROWSER | 4 |
| | | VIDEO | BROWSER | 7 |
| | | | MEDIA APP | 8 |
| | | MUSIC | BROWSER | 5 |
| | | | MEDIA APP | 6 |
| 2 | MOBILE PHONE | PHONE CALL | PHONE CALL APP | 10 |
| | | CONF CALL | CONF APP | 19 |
| | | | BROWSER | 20 |
| | | | PHONE CALL APP | 18 |
| | | VIDEO | BROWSER | 40 |
| | | | MEDIA APP | 25 |
| | | MUSIC | BROWSER | 41 |
| | | | MEDIA APP | 17 |
| 3 | LAPTOP | CONF CALL | CONF APP | 13 |
| | | | BROWSER | 14 |
| | | VIDEO | BROWSER | 35 |
| | | | MEDIA APP | 34 |
| | | MUSIC | BROWSER | 45 |
| | | | MEDIA APP | 42 |

For example consider a scenario, where the first audio data from the first audio device is music from a media app on a mobile phone and thus the first audio data comprises (DTI_1, CTI_1, ATI_1)=(MOBILE PHONE, MUSIC, MEDIA APP) and the second audio data from the second audio device is a conference call from a conference app on a laptop and thus the second audio data comprises (DTI_2, CTI_2, ATI_2)=(LAPTOP, CONF CALL, CONF APP). The hearing device/processor determines via the audio configuration in Table 1 and based on the first audio data and the second audio data, the first priority of the first device (mobile phone) to "17" and the second priority of the second audio device (laptop) to "13", selects the audio device with the highest priority, i.e. the second audio device (laptop) in this case, and provides an audio output according to the audio output scheme, i.e. the audio of the conference call on the laptop is output via receiver/loudspeaker of the interface.

The audio configuration may comprise a default device setting, e.g. for handling or managing audio device(s) of a type not having a matching device setting stored in the hearing device/audio configuration. The audio configuration/default device setting may comprise one or more of a default priority, a default device priority, a default context priority, and a default application priority.

In one or more example hearing devices, to determine a first priority based on the first audio data comprises to determine whether the audio configuration comprises a first device setting associated with the first audio device, e.g. based on first device identifier of the first audio data, and in accordance with a determination that the audio configuration does not comprise a first device setting, determine the first priority based on the default device setting, such as based on one or more of the default device priority, the default context priority, and the default application priority of the default device setting. In other words, the audio configuration may define a device setting allowing the hearing device to handle incoming audio from audio device with no pre-defined device setting.

The audio configuration may comprise or define different audio configurations/device settings/priorities for different times or time ranges. Thus, the audio configuration may comprise a first audio configuration for a first time range or a first set of time ranges, and a second audio configuration for a second time range or a second set of time ranges. Thereby an audio device may be assigned different device settings for different times.

A method for operating a hearing device comprising an interface, a processor, and a memory is provided, wherein the method comprises receiving, via the interface, first audio data from a first audio device; receiving, via the interface, second audio data from a second audio device; determining an audio output scheme based on the first audio data and the second audio data; and providing, e.g. via receiver/loudspeaker of the interface, an audio output according to the audio output scheme.

It is noted that descriptions and features of hearing device functionality, such as hearing device configured to, also apply to methods and vice versa. For example, a description of a hearing device configured to determine an audio output scheme also applies to a method of operating a hearing device, wherein the method comprises determining an audio output scheme, and vice versa. The hearing device disclosed herein may be configured to perform any of the methods herein.

FIG. 1 shows an example hearing system 1 comprising an example hearing device 2, one or more accessory devices, and one or more audio devices. The hearing system comprises one or more of a first accessory device 4, a first audio device 6, and a second audio device 8. As illustrated in FIG. 1, the first accessory device 4 and the first audio device 6 may be implemented in a single device, such as a mobile phone as illustrated in FIG. 1, a tablet computer, a laptop computer, or a personal computer. The second audio device 8 may be a laptop computer as illustrated in FIG. 1, a spouse microphone device, wireless TV audio transmitter, music player, car, doorbell, mobile phone, smart watch, and wireless audio transmitters, such as public wireless audio transmitter, e.g. in airports, train stations, stadiums, cinemas, arenas, and/or emergency vehicles, such as ambulances, police cars, firetrucks, etc.

The first accessory device or accessory device 4 may be an accessory device as described herein. The accessory device 4 is for a hearing device 2, the accessory device 4 comprising an interface 4A, one or more processors, and a memory, the memory 4C having an audio configuration 34A of the hearing device stored therein, the audio configuration optionally comprising a visibility setting indicative of a visibility of the hearing device, wherein the one or more processors are configured to receive, via the interface 4A, a configuration request for update of the audio configuration, the configuration request optionally comprising an updated visibility setting; determine, in response to the configuration request, an updated audio configuration optionally including the updated visibility setting; and transmit, via the interface, the updated audio configuration 34B to the hearing device.

The hearing device 2 comprises an interface, a processor 10 for provision of an electrical output signal 10A, and a memory 12, the memory 12 having an audio configuration 34 stored therein, the audio configuration optionally comprising a visibility setting indicative of a visibility of the hearing device. The hearing device 2 is a hearing aid, wherein the processor 10 is configured to compensate for a hearing loss of a user.

The interface of hearing device 2 comprises one or more microphones including a first microphone 14 for provision of a first microphone input signal 14A, and optionally a second microphone 16 for provision of a second microphone input signal 16A. The microphones 14, 16 may be omitted.

The interface of hearing device 2 comprises a first wireless communication unit 18 being a transceiver 19 and an antenna 20 coupled to the first wireless communication unit 18 and configured for wireless communication, e.g. with one or more audio devices, such as first audio device 6 and second audio device 8. The transceiver 19 is configured to convert wireless input signal(s) including first wireless input signal 22 from first audio device 6 and second wireless input signal 24 from second audio device 8 to one or more transceiver input signals 26.

The processor 10 is configured to process one or more input signals 14A, 16A, 26 and provide an electrical output signal 10A based on one or more of input signals 14A, 16A, 26.

The hearing device 2/processor 10 is configured to receive, via the interface such as via antenna 20/transceiver 19, an updated audio configuration 34B; store the updated audio configuration 34B as the audio configuration 34 in the memory 12; and operate the hearing device 2 according to the audio configuration 34.

The interface of hearing device 2 comprises a receiver 28 for converting the electrical output signal 10A to an audio output or audio output signal.

The hearing device 2 is configured to receive, via the interface, such as transceiver 19, first audio data 30 encoded or embedded in first wireless input signal 22 from the first audio device 6.

The hearing device 2 is configured to receive, via the interface, such as transceiver 19, second audio data 32 encoded or embedded in second wireless input signal 24 from the second audio device 8.

For example, to operate the hearing 2 according to the audio configuration 34 may comprise to determine an audio output scheme based on the updated audio configuration stored as the audio configuration 34, the first audio data 30, and the second audio data 32; and provide, e.g. via a receiver or loudspeaker of the interface, an audio output according to the audio output scheme.

In other words, the hearing device 2 is configured to determine an audio output scheme based on the first audio data 30, the second audio data 32, and the audio configuration 34, e.g. as outlined above with reference to Table 1.

The hearing device 2 is configured to provide an audio output according to the audio output scheme. The audio output may be based on the first audio data 30 and/or the second audio data 32.

Figure 2:
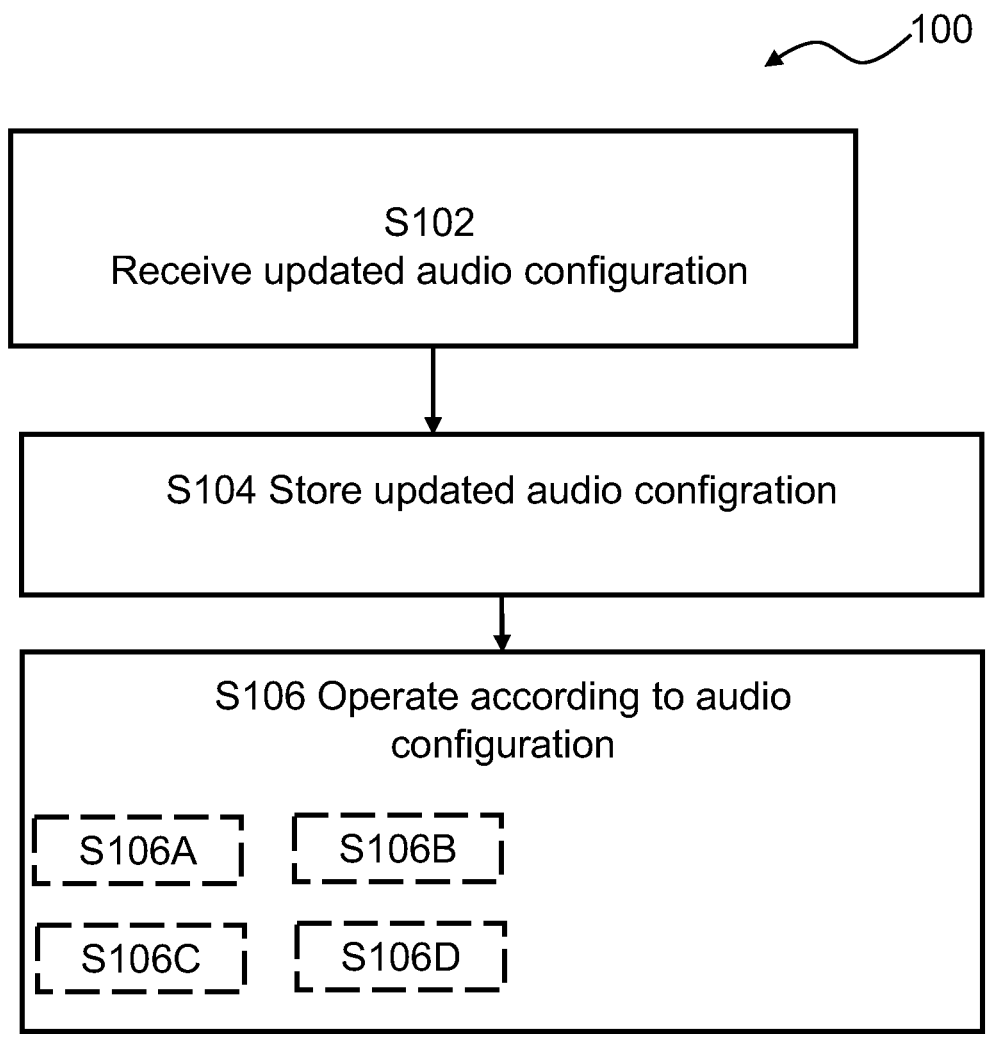
FIG. 2 is a flow diagram of an exemplary method according to the disclosure.

FIG. 2 is a flow diagram of an exemplary method for operating a hearing device comprising an interface, a processor, and a memory, wherein the method 100 comprises receiving S102, via the interface, an updated audio configuration, the updated audio configuration optionally comprising a visibility setting indicative of the hearing device; storing S104 the updated audio configuration as audio configuration in the memory; and operating S106 the hearing device according to the audio configuration. Operating S106 the hearing device according to the audio configuration optionally comprises receiving S106A first audio data (AD_1) from a first audio device; receiving S106B, via the interface, second audio data (AD_2) from a second audio device; determining S106C an audio output scheme based on the audio configuration, the first audio data (AD_1), such as one or more of a first device identifier, a first device type identifier, a first context type identifier, and a first application identifier of the first audio data, and the second audio data (AD_2), such as one or more of a a second device identifier, a second device type identifier, a second context type identifier, and a second application identifier of the second audio data; and providing S106D an audio output, e.g. via receiver/loudspeaker of the interface, according to the audio output scheme.

Figure 3:
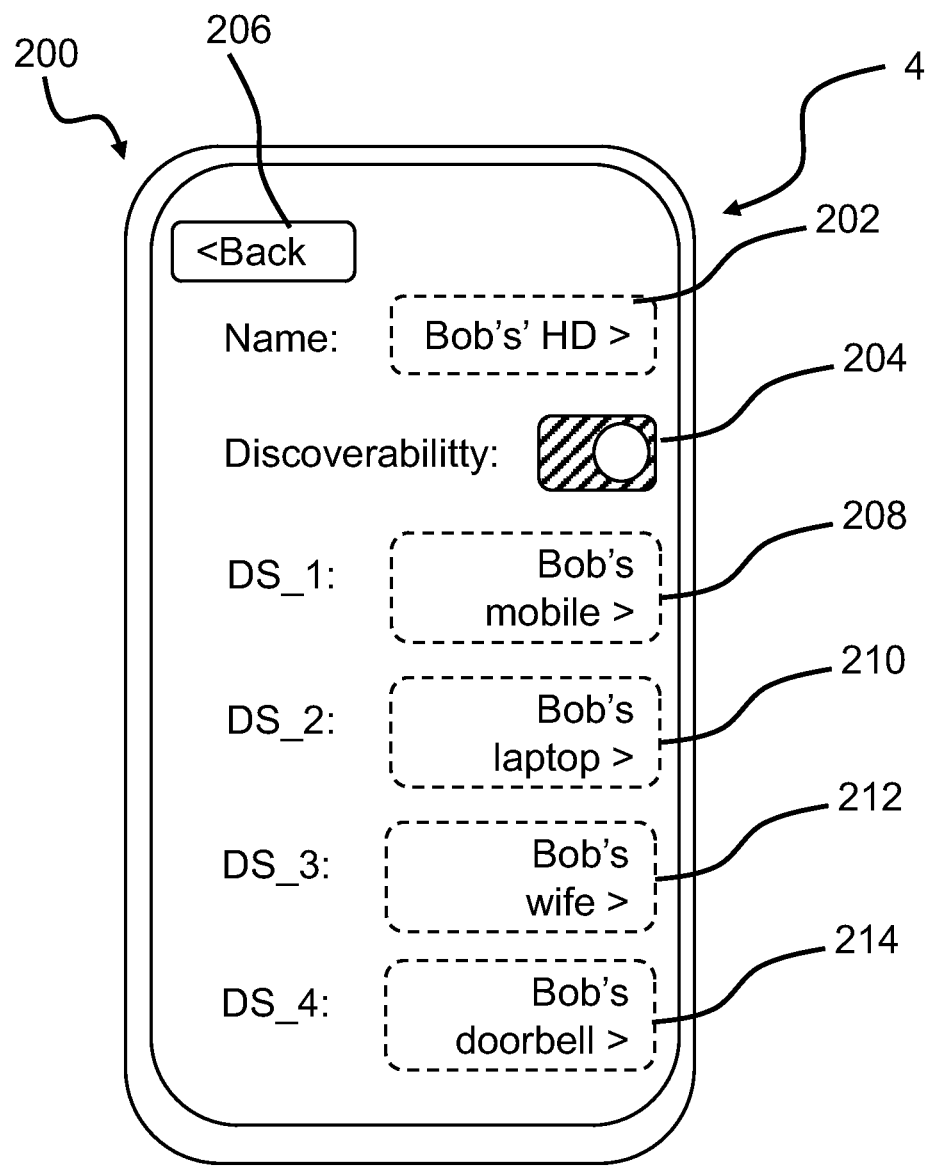
FIG. 3 schematically illustrates an exemplary user interface for setting and/or updating an audio configuration of an audio device, and FIG. 4 schematically illustrates an exemplary device setting user interface for setting and/or updating an audio configuration of an audio device.

FIG. 3 shows an exemplary user interface of an accessory device for setting, adapting, or adjusting an audio configuration of a hearing device. The user interface 200 is displayed on a touch sensitive display of the accessory device and may be generated based on the audio configuration 34A stored in the memory of the accessory device.

The user interface 200 optionally comprises a name user interface element 202 for display and/or updating of a name setting ("Bob's HD") of the audio configuration of the hearing device. Upon, a user pressing or activating the name user interface element 202, the accessory device proceeds to display a name setting user interface allowing the user to edit the name setting of the hearing device.

The user interface 200 optionally comprises a discoverability user interface element 204 for display and/or updating of a discoverability of the audio configuration of the hearing device. The discoverability user interface element 204 is a toggle switch displaying whether the hearing device is in discovery mode and allowing the user to switch between discovery mode and another mode, such as hidden mode. In one or more example accessory devices, a user input activating the discoverability user interface element 204 may be seen as or constitute a configuration request.

The user interface 200 comprises a back user interface element 206 for returning to a previous user interface of the accessory device. In one or more example accessory devices, a user input activating the back user interface element 206 may be seen as or constitute a configuration request.

The user interface 200 comprises one or more device user interface elements for updating device settings of the audio configuration.

The user interface 200 comprises a first device user interface element 208. The first device user interface element 208 optionally comprises/displays a first audio device name ("Bob's mobile") of the first audio device according to a first audio device name setting included in the audio configuration 34A and/or the audio configuration 34A. The first device user interface element 208 allows for updating a first device setting of the audio configuration 34 of the hearing device. Upon a user pressing or activating the first device user interface element 208, the accessory device proceeds to display a first device setting user interface allowing the user to edit the first device setting of the hearing device. In one or more example accessory devices, the first device setting user interface may be a drop-down user interface within user interface 200 or a separate user interface comprising a back user interface element, e.g. for returning to a previous user interface, such as user interface 200 of the accessory device. In one or more example accessory devices, a user input activating a back user interface element of the first device setting user interface may be seen as or constitute a configuration request.

The user interface 200 optionally comprises a second device user interface element 210. The second device user interface element 210 optionally comprises/displays a second audio device name ("Bob's laptop") of the second audio device according to a second audio device name setting included in the audio configuration 34A and/or the audio configuration 34A. The second device user interface element 210 allows for updating a second device setting of the audio configuration 34 of the hearing device. Upon a user pressing or activating the second device user interface element 210, the accessory device proceeds to display a second device setting user interface allowing the user to edit the second device setting of the hearing device. In one or more example accessory devices, the second device setting user interface may be a drop-down user interface within user interface 200 or a separate user interface comprising a back user interface element, e.g. for returning to a previous user interface, such as user interface 200 of the accessory device. In one or more example accessory devices, a user input activating a back user interface element of the second device setting user interface may be seen as or constitute a configuration request.

The user interface 200 optionally comprises a third device user interface element 212. The third device user interface element 212 optionally comprises/displays a third audio device name ("Bob's wife") of the third audio device according to a third audio device name setting included in the audio configuration 34A and/or the audio configuration 34A. In the present example, "Bob's wife" refers to a spouse microphone worn by Bob's wife, i.e. the third audio device is a spouse microphone. The third device user interface element 212 allows for updating a third device setting of the audio configuration 34 of the hearing device. Upon a user pressing or activating the third device user interface element 212, the accessory device proceeds to display a third device setting user interface allowing the user to edit the third device setting of the hearing device. In one or more example accessory devices, the third device setting user interface may be a drop-down user interface within user interface 200 or a separate user interface comprising a back user interface element, e.g. for returning to a previous user interface, such as user interface 200 of the accessory device. In one or more example accessory devices, a user input activating a back user interface element of the third device setting user interface may be seen as or constitute a configuration request.

The user interface 200 optionally comprises a fourth device user interface element 214. The fourth device user interface element 214 optionally comprises/displays a fourth audio device name ("Bob's doorbell") of the fourth audio device according to a fourth audio device name setting included in the audio configuration 34A and/or the audio configuration 34A. In the present example, "Bob's doorbell" refers to a doorbell in Bob's house, i.e. the fourth audio device is a doorbell. The fourth device user interface element 214 allows for updating a fourth device setting of the audio configuration 34 of the hearing device. Upon a user pressing or activating the fourth device user interface element 214, the accessory device proceeds to display a fourth device setting user interface allowing the user to edit the fourth device setting of the hearing device. In one or more example accessory devices, the fourth device setting user interface may be a drop-down user interface within user interface 200 or a separate user interface comprising a back user interface element, e.g. for returning to a previous user interface, such as user interface 200 of the accessory device. In one or more example accessory devices, a user input activating a back user interface element of the fourth device setting user interface may be seen as or constitute a configuration request.

As mentioned above, user interface 200 may be generated based on the audio configuration 34A stored in the memory of the accessory device. An example audio configuration 34A forming the basis of user interface 220 is shown in Table 3 below, where the first column comprises name settings of the hearing device and associated audio devices as reflected in user interface elements 202, 208, 210, 212, 214.

TABLE 3

Example audio configuration of audio device

| Bob's HD | DTI | CTI | ATI | Priority setting |
|---|---|---|---|---|
| Bob's mobile | MOBILE PHONE | PHONE CALL | PHONE CALL APP | 10 |
| | | CONF CALL | CONF APP | 19 |
| | | | BROWSER | 20 |
| | | | PHONE CALL APP | 18 |
| | | VIDEO | BROWSER | 40 |
| | | | MEDIA APP | 25 |
| | | MUSIC | BROWSER | 41 |
| | | | MEDIA APP | 17 |
| Bob's laptop | LAPTOP | CONF CALL | CONF APP | 13 |
| | | | BROWSER | 14 |
| | | VIDEO | BROWSER | 35 |
| | | | MEDIA APP | 34 |
| | | MUSIC | BROWSER | 45 |
| | | | MEDIA APP | 42 |
| Bob's wife | SPOUSE MIC | | | 7 |
| Bob's doorbell | DOORBELL | | | 5 |

Figure 4:
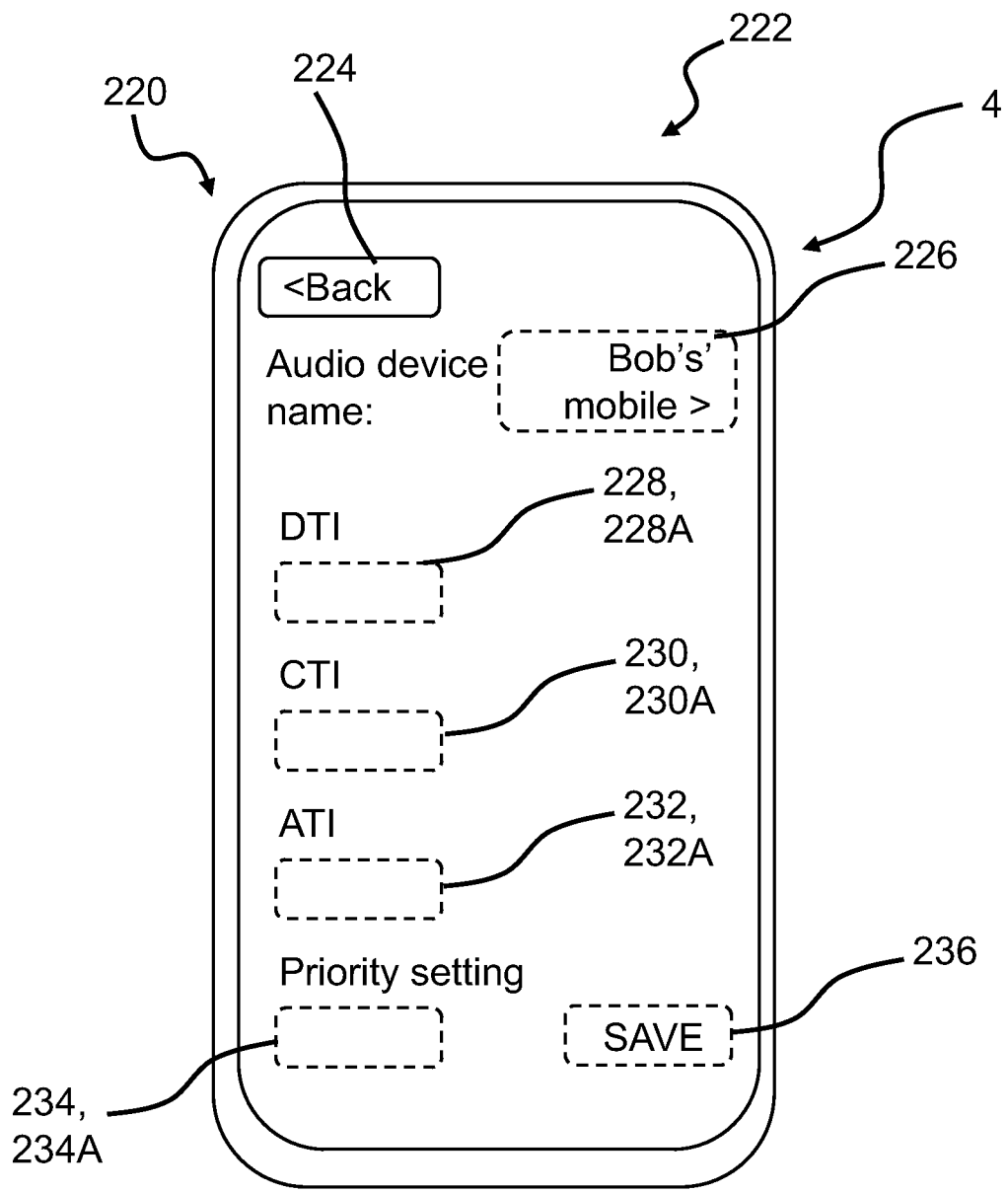

FIG. 4 shows an exemplary device setting user interface of an accessory device for setting, adapting, or adjusting a device setting of an audio configuration. The device setting user interface 220 is a first device setting user interface 222 for setting and/or updating first priority settings associated with the first audio device, i.e. Bobs mobile in FIG. 3.

The first device setting user interface 222 comprises a back user interface element 224 for returning to a previous user interface of the accessory device, such as user interface 220. In one or more example accessory devices, a user input activating the back user interface element 222 may be seen as or constitute a configuration request.

The first device setting user interface 222 comprises a name user interface element 226 for display and/or updating of a name setting ("Bob's mobile") of the first audio device. Upon, a user pressing or activating the name user interface element 226, the accessory device proceeds to display a name setting user interface allowing the user to edit the name setting of the first audio device.

The first device setting user interface 222 comprises a device type user interface element 228 for selecting a device type identifier of the first audio device. The device type user interface element 228 may be a drop-down list 228A with a list of device types as items.

The first device setting user interface 222 comprises a context type user interface element 230 for selecting a context type identifier of the first audio device. The context type user interface element 230 may be a drop-down list 230A with a list of context types as items. The items of the drop-down list 230A may be generated based on the user selection of a device type identifier in the device type user interface element 228/drop-down list 228A.

The first device setting user interface 222 comprises an application type user interface element 232 for selecting an application type identifier of the first audio device. The application type user interface element 232 may be a drop-down list 232A with a list of application types as items. The items of the drop-down list 232A may be generated based on the user selection of a context type identifier in the context type user interface element 230/drop-down list 230A and/or based on the user selection of a device type identifier in the device type user interface element 228/drop-down list 228A.

In one or more example, accessory devices, the order of context type user interface element 230 and application type user interface element 232 is switched. Thus, a user selection of an application type identifier in the application type user interface element 232/drop-down list 232A and/or a user selection of a device type identifier in the device type user interface element 228/drop-down list 228A may control the items of the drop-down list 230A. Accordingly, the items of the drop-down list 230A may be generated based on the user selection of an application type identifier in the application type user interface element 232/drop-down list 232A and/or based on the user selection of a device type identifier in the device type user interface element 228/drop-down list 228A.

The first device setting user interface 222 comprises a priority setting user interface element 234 for selecting/updating a priority setting for the combination of identifiers selected in user interface elements 228, 230, 232. The priority setting user interface element 234 may be a drop-down list 234A with a list of priorities as items. The items/priorities of the drop-down list 234A may be generated based on available priority settings within the first device setting and/or within the audio configuration. Thereby different identifier combination cannot be assigned the same priority. In other words, a priority setting selected for an identifier combination, such as (MOBILE PHONE, PHONE CALL, PHONE CALL APP) cannot be selected for another identifier combination, such as (LAPTOP, CONF CALL, BROWSER).

Dynamically generated drop-down lists 228A, 230, 232A, 234A allows for fast and fail-safe updating/setting of the audio configuration of the hearing device.

The first device setting user interface 222 optionally comprises a save user interface element 236 for storing the selected combination of DTI, CTI, and ATI with associated priority setting in or as part of the updated audio configuration. In one or more example device setting user interfaces 220, the accessory device is configured to, upon a user activation of the back user interface element 224, storing the selected combination of DTI, CTI, and ATI with associated priority setting in or as part of the updated audio configuration.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-4 comprise some modules or operations which are illustrated with a solid line and some modules or operations which are illustrated with a dashed line. The modules or operations which are comprised in a solid line are modules or operations which are comprised in a broad example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1 hearing system
2 hearing device
4 accessory device
4A interface of accessory device
4B one or more processors of accessory device
4C memory of accessory device
6 first audio device
8 second audio device
10 processor/processing unit
10A electrical output signal
12 memory
14 first microphone
14A first microphone input signal
16 second microphone
16A second microphone input signal
18 wireless communication unit
19 transceiver
20 antenna
22 first wireless input signal
24 second wireless input signal
26 transceiver input signal
28 receiver
30 first audio data
32 second audio data
34 audio configuration
34A audio configuration
34B updated audio configuration
100 method for operating a hearing device
S102 receiving, via the interface, an updated audio configuration, the updated audio configuration comprising a visibility setting indicative of the hearing device
S104 storing the updated audio configuration as audio configuration in the memory
S106 operating the hearing device according to the audio configuration
S106A receiving, via the interface, first audio data from a first audio device
S106B receiving, via the interface, second audio data from a second audio device
S106C determining an audio output scheme based on the first audio data and the second audio data
S106D providing an audio output according to the audio output scheme
200 user interface
202 name user interface element
204 discoverability user interface element
206 back user interface element
208 first device user interface element
210 second device user interface element
212 third device user interface element
214 fourth device user interface element
220 device setting user interface
222 first device setting user interface
224 back user interface element
226 name user interface element
228 device type user interface element
228A drop-down list with a list of device types as items
230 context type user interface element
230A drop-down list with a list of context types as items
232 application type user interface element
232A drop-down list with a list of application types as items
234 priority setting user interface element
234A drop-down list 234A with a list of priorities as items
236 save user interface element

The invention claimed is:

1. An accessory device for a hearing device, the accessory device comprising:
an interface;
one or more processors; and
a memory, the memory having an audio configuration of the hearing device stored therein, the audio configuration comprising a visibility setting indicative of visibility of the hearing device;
wherein the interface is configured to receive a configuration request for update of the audio configuration, the configuration request comprising an updated visibility setting;
wherein the one or more processors are configured to determine, in response to the configuration request, an updated audio configuration, the updated audio configuration comprising the updated visibility setting; and
wherein the interface is configured to transmit the updated audio configuration to the hearing device.

2. The accessory device according to claim 1, the visibility setting comprising a discoverability setting of the hearing device, wherein the configuration request comprises an updated discoverability setting, and wherein the updated audio configuration comprises the updated discoverability setting.

3. The accessory device according to claim 1, the visibility setting comprising a name setting, wherein the configuration request comprises an updated name setting, and wherein the updated audio configuration comprises the updated name setting.

4. The accessory device according to claim 1, wherein the configuration request comprises a first device setting for a first audio device, the first device setting comprising one or more of an updated first priority setting, an updated first device priority, an updated first context priority, and an updated first application priority, and wherein the updated audio configuration comprises the first device setting.

5. The accessory device according to claim 4, wherein the configuration request comprises a second device setting for a second audio device, the second device setting comprising one or more of an updated second priority setting, an updated second device priority, an updated second context priority, and an updated second application priority, and wherein the updated audio configuration comprises the second device setting.

6. The accessory device according to claim 1, wherein the one or more processors are configured to determine the updated audio configuration by:
determining an updated audio selection scheme; and
including the updated audio selection scheme in the updated audio configuration.

7. The accessory device according to claim 6, wherein the updated audio selection scheme is based on:
one or more of an updated first priority setting, an updated first device priority, an updated first context priority, and an updated first application priority; and/or one or more of an updated second priority setting, an updated second device priority, an updated second context priority, and an updated second application priority.

8. The accessory device according to claim 1, wherein the interface comprises a camera.

9. The accessory device according to claim 1, wherein the accessory device is configured to obtain image data, and determine a source identifier based on the image data.

10. The accessory device according to claim 9, wherein the one or more processors are configured to determine the updated audio configuration by including the source identifier in the updated audio configuration.

11. The accessory device according to claim 10, wherein the configuration request for update of the audio configuration comprises the image data.

12. The accessory device according to claim 1, wherein the accessory device is configured to provide a user interface for allowing a user to edit a device setting of the hearing device.

13. The accessory device according to claim 1, wherein the accessory device is a tablet computer or a laptop computer.

14. The accessory device according to claim 1, wherein the accessory device is a smartphone or a smart watch.

15. An accessory device for a hearing device, the accessory device comprising:

a camera;
one or more processors; and
a memory, the memory having an audio configuration of the hearing device stored therein;
wherein the camera is configured to provide image data;
wherein the one or more processors are configured to process the image data, and determine an updated audio configuration based on the processed image data; and
wherein the interface is configured to transmit the updated audio configuration to the hearing device.

16. The accessory device according to claim 15, wherein the accessory device is configured to determine a source identifier based on the image data.

17. The accessory device according to claim 16, wherein the one or more processors are configured to determine the updated audio configuration by including the source identifier in the updated audio configuration.

18. The accessory device according to claim 15, wherein the accessory device is configured to provide a user interface for allowing a user to edit a device setting of the hearing device.

19. The accessory device according to claim 15, wherein the accessory device is a tablet computer or a laptop computer.

20. The accessory device according to claim 15, wherein the accessory device is a smartphone or a smart watch.

* * * * *